United States Patent [19]

Matz et al.

[11] Patent Number: 4,764,328
[45] Date of Patent: Aug. 16, 1988

[54] METHOD OF FUSION BONDING LOW DENSITY THERMOPLASTIC BODIES

[75] Inventors: Bruno Matz, Milford; Dolores C. Kearney, Inkster, both of Mich.

[73] Assignee: Ford Motor Company, Dearborn, Mich.

[21] Appl. No.: 28,815

[22] Filed: Mar. 23, 1987

[51] Int. Cl.$^4$ .................. B32B 31/20; B29C 65/00; B29C 43/00; B29D 7/00

[52] U.S. Cl. .................. 264/248; 156/304.6; 156/309.6; 156/309.9; 156/499; 425/508; 425/451.7; 425/520; 425/DIG. 5

[58] Field of Search ............... 264/248, 545; 425/508, 425/DIG. 5, 520, 451.7; 156/304.6, 499, 228, 583.1, 309.6, 309.9

[56] References Cited

U.S. PATENT DOCUMENTS

| | | |
|---|---|---|
| 4,190,093 | 2/1980 | Kearney et al. . |
| 4,443,288 | 4/1984 | Sawada et al. .................. 156/304.6 |
| 4,595,446 | 6/1986 | Newkirk et al. . |
| 4,640,728 | 2/1987 | Martin et al. . |

*Primary Examiner*—Jan H. Silbaugh
*Assistant Examiner*—Yun H. Wang

*Attorney, Agent, or Firm*—Joseph W. Malleck; Roger L. May

[57] ABSTRACT

A method for contact fusion bonding of compressible, low density thermoplastic parts is disclosed, which comprises essentially: (a) fluidizing only a surface film on opposed mateable margins of the thermoplastic parts by precompressing the margins against a transversely stationary heated platen located therebetween and, prior to fluidization, continuing such contact to promote such fluidization by thermal conductivity and make heat-settable a limited, predetermined, nonmelted subsurface layer of said mateable margins; and (b) within a time period during which said surface films remain fluid, withdraw said platen from between said opposed margins with minimal separation while bringing the mateable margins together with sufficient force to merge said fluid films and compress said subsurface layers a predetermined moulded dimension. The time period during which the fluid films must be merged after removal of the heated platen is typically less than one second for most low density thermoplastics (low density here being used to mean less than or equal to 2.5 lbs/ft$^3$).

18 Claims, 13 Drawing Sheets

Heat Platen In Partial Retract Position

FIG. 1.

Parts In Melt Position

FIG. 4.

Heat Platen In Partial Retract Position

METHOD OF FUSION BONDING LOW DENSITY THERMOPLASTIC BODIES

BACKGROUND OF THE INVENTION

1. Technical Field

This invention relates to the art of rapid fusion bonding of low density thermoplastic bodies and, more particularly, to the art of making substantially invisible, leakproof joints between such low density thermoplastic bodies.

2. Description of the Prior Art

A commercial need has arisen for bonding together low density thermoplastic bodies as a result of the introduction of the evaporative casting process (ECP). ECP is a process for casting molten metals that uses a plastic foam pattern which is destroyed (evaporated) upon contact with the molten metal. In adapting ECP to the making of large, complex engine components, such as engine blocks or engine heads, the internal surfaces of such pattern cannot be adequately defined unless made in smaller pattern portions which are subsequently joined together. In addition ECP requires that the joint between such pattern portions be leakproof. The bonded plastic assembly is dipped in an aqueous refractory solution to form a thin coating thereon; if such solution penetrates into any voids of the joint, the dried refractory solution will not be replaced by molten metal during the casting process and result in casting defects.

Considerable research has been undertaken to develop improved cost-effective and technically sound means for rigidly bonding such pattern portions together to create a unitary assembly that is not physically inhibited by joints in any way. Early attempts to achieve this goal have included chemical techniques (which are outside the field of this invention) such as solvent bonding (U.S. Pat. No. 4,595,446) and hot melt gluing (U.S. Pat. No. 4,640,728). Solvent bonding is disadvantageous because it creates fumes and is difficult to control. Hot melt gluing is disadvantageous because it (a) does not create an optimally strong bond, (b) adds unwanted organic material that must be vaporized during metal casting, which not only aggravates dimensional control of the casting but contaminates the mould medium, and (c) often creates appearance problems on the final casting due to its messy presence along the joint interior resulting from its low viscosity and runniness.

A recent attempt has been made to effect contact bonding as demonstrated by vibration welding of thermoplastic bodies (U.S. Pat. No. 4,190,093). Although such vibration welding technique has achieved some degree of success in thick cross-sections, it lacks dimensional control in thin wall sections.

Thermal welding of hard, high density plastics has been carried out in the making of automotive lenses and battery cases. Such thermal welding technique is outside the field of this invention because (a) high density thermoplastics retain their melted condition for considerably longer periods of time obviating a need for rapid contact in fusion, and (b) most applications of such high density plastics require a joint which is primarily structural (see U.S. Pat. No. 4,443,288).

SUMMARY OF THE INVENTION

A primary object of this invention is to provide a method of making substantially invisible, leakproof joints between fused, low density thermoplastic bodies. Such method is characterized by: (a) improved casting quality as well as improved and repeatable dimensional control of the final pattern configuration; (b) lower pattern making costs due to, (i) less complex equipment needed to carry out the bonding (ii) elimination of commercial bonding agents, (iii) reduced equipment maintenance, and (iv) less labor intensiveness; (c) increased pattern productivity resulting from (i) faster bonding cycle times, and (ii) quicker changeover to different thermoplastic body configurations; and (d) reduced contamination of moulding sand.

The method of this invention consists essentially of: (a) fluidizing only a surface film on opposed mateable margins of compressible, low density thermoplastic portions by precompressing the margins against a transversely stationary heated platen located therebetween and, prior to fluidization, continuing such contact to promote such fluidization by thermal conductivity and make heat-settable a limited, predetermined, nonmelted subsurface layer of said mateable margins; and (b) within a time period during which said surface films remain fluid, withdraw said platen from between said opposed margins with minimal separation while bringing said mateable margins together with sufficient force to merge said fluid films and compress said subsurface layers a predetermined moulded dimension.

The time period during which the fluid films must be merged after removal of the heated platen is typically less than one second for most low density thermoplastics (low density here being used to mean less than or equal to 2.5 pounds/cubic foot). The moulding of a subsurface layer permits extremely accurate bonded assembly configurations heretofore unattainable in the bonding of low density thermoplastics. The internal joint surfaces can almost be devoid of any joint line, which is important to smooth fluid flow therepast for engine components.

More particularly, the method of this invention permanently attaches mateable margins of compressible, low density thermoplastic pattern portions, said pattern portions being useful in ECP. The method, more particularly, comprehends: (a) supporting opposed pattern portions on fixtures effective to pivotally or linearly move said portions between a first position in which said mateable margins are spaced apart and a second position in which said margins are mated, said fixtures being selectively resiliently biased to carry said portions to said second position; (b) moving a platen, heated to a temperature to fluidize a surface region of the pattern portions on contact therewith, between said fixtures while out of contact with said biased portions; (c) when said platen and mateable margins are frontally aligned, permitting said bias to effect transversely stationary contact of said margins with said platen, said bias being limited to compress said margins, prior to fluidizing, to a depth substantially equal to the desired dimensional depth of fluidizing; (d) holding said platen in contact with said margins for a period of time to melt the compressed margins; (e) substantially immediately thereafter, withdrawing said platen from between said fixtures while overcoming said bias to maintain a minimal separation between said opposed margins and platen throughout said withdrawal movement; (f) as said platen is moving out of the sight line between said opposed mateable margins, permitting said bias to slip said mateable margins together while said fluidized films remain fluid; and (g) allowing said fluid films to thermally set to effect a weld.

Preferably, the fluidized film is generated to a thickness in the range of 0.003–0.0010 inches. Preferably, the support structure for the pattern portions is arranged for linear movement to and from each other in a plane and under the influence of the biasing forces. Preferably, the platen, carrying opposed heating surfaces, is moveable in a direction transverse to the direction of movement of said pattern portions.

The platen and fixture preferably carry cooperative camming means so that, upon transverse movement of the platen, the pattern portions are out of contact with the platen heating surfaces only a minimal separation distance until such time as the platen heating surfaces are frontally aligned with the mateable margins to be heated. Mechanical stops are preferably employed to regulate compression of the thermoplastic prior to melting. Upon completion of the heating step, the camming means will, upon transverse withdrawal of the platen, maintain a minimal separation distance of the heating surfaces from the margins; as the platen clears the sight line between the mateable margins, the mateable margins slip together for regulated compression and setting of the weld. The time period between removal of the platen from heating contact with the pattern portions and the moment of merging of the fluid films must be rapid. Preferably, the opposed heating surfaces are closely spaced and the separation between the margins and heated surfaces during withdrawal is minimized to facilitate quick movement of the margins to a mated condition.

SUMMARY OF THE DRAWINGS

FIGS. 3–7 are views similar to FIG. 2, but showing different operative positions of the apparatus.

FIGS. 8–13 are schematic plan views of another form of apparatus for carrying out the method of this invention;

DETAILED DESCRIPTION AND BEST MODE

The pattern portions to be bonded together as a result of practicing the method of this invention are comprised of thermoplastic material which is highly compressible and is low in density (in the range of 0.75–2.5 lbs/ft$^3$). The thermoplastic material is of a soft, deformable type usually created by steam expansion of the thermoplastic beads against a pattern mould wall to define the shape of the pattern portions. The thermoplastic material may be selected from the group consisting of polystyrene, polymethylmethacrylate, or polycarbonates.

The pattern portions are adapted to have a margin, or in some cases a complete surface, to mate with an opposing margin or surface of another pattern portion. Typically, these mateable margins lie in a common plane, but may be stepped or angulated out of the frontal plane, provided the heating platen can maintain access to such out-of-plane margins.

A most important characteristic of the present method is the use of limited compression forces (i.e., 50–450 psi) to compress the mateable margins prior to melting to (a) create a tight, intimate contact with the heated platen prior to melting, and (b) control the depth of melting primarily to that material which is compressed. Compression forces are also used during heat setting to mold a heat settable subsurface layer of the margins during final bonding of the margins to achieve increased accuracy of shape.

Another important characteristic of the present method is the recognition that the film of melt (usually 0.003–0.01 inches, and is to be distinguished from the thicker layers used in the prior art, part of which must be displaced during melting) is fluid only for an extremely short period of time, typically less than one second, upon removal of heat. Therefore, the fluid films must be merged together during this time span and with limited compression to compress the subsurface layers which have been made heat-settable. Optimally, the compression may generate a fine, invisible-like bead of melt around the joint interface to effect a leakproof welded joint.

If the thermoplastic portions contain moisture prior to fluidizing, the temperature and time for such may have to be increased up to 30%, but in any event must be limited to prevent radiation destruction of any portion even remote from the margins.

Figure 1:
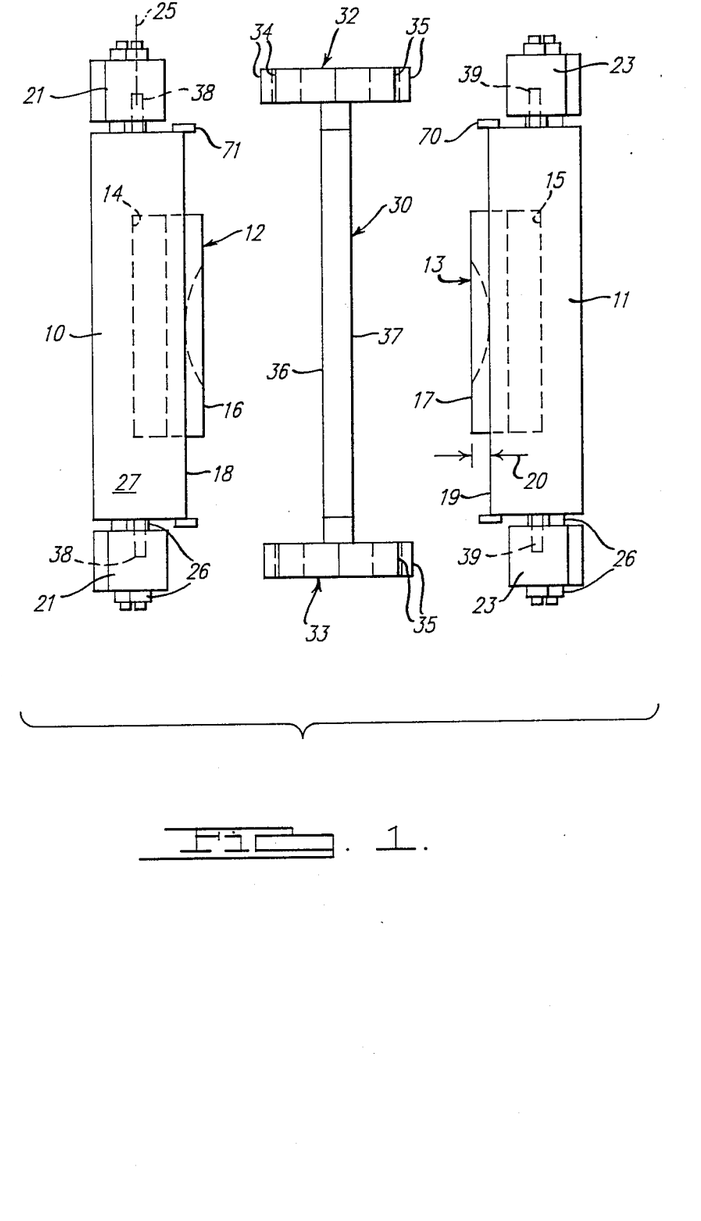
FIG. 1 is an end elevational view of the apparatus shown in FIG. 2.
Figure 2:
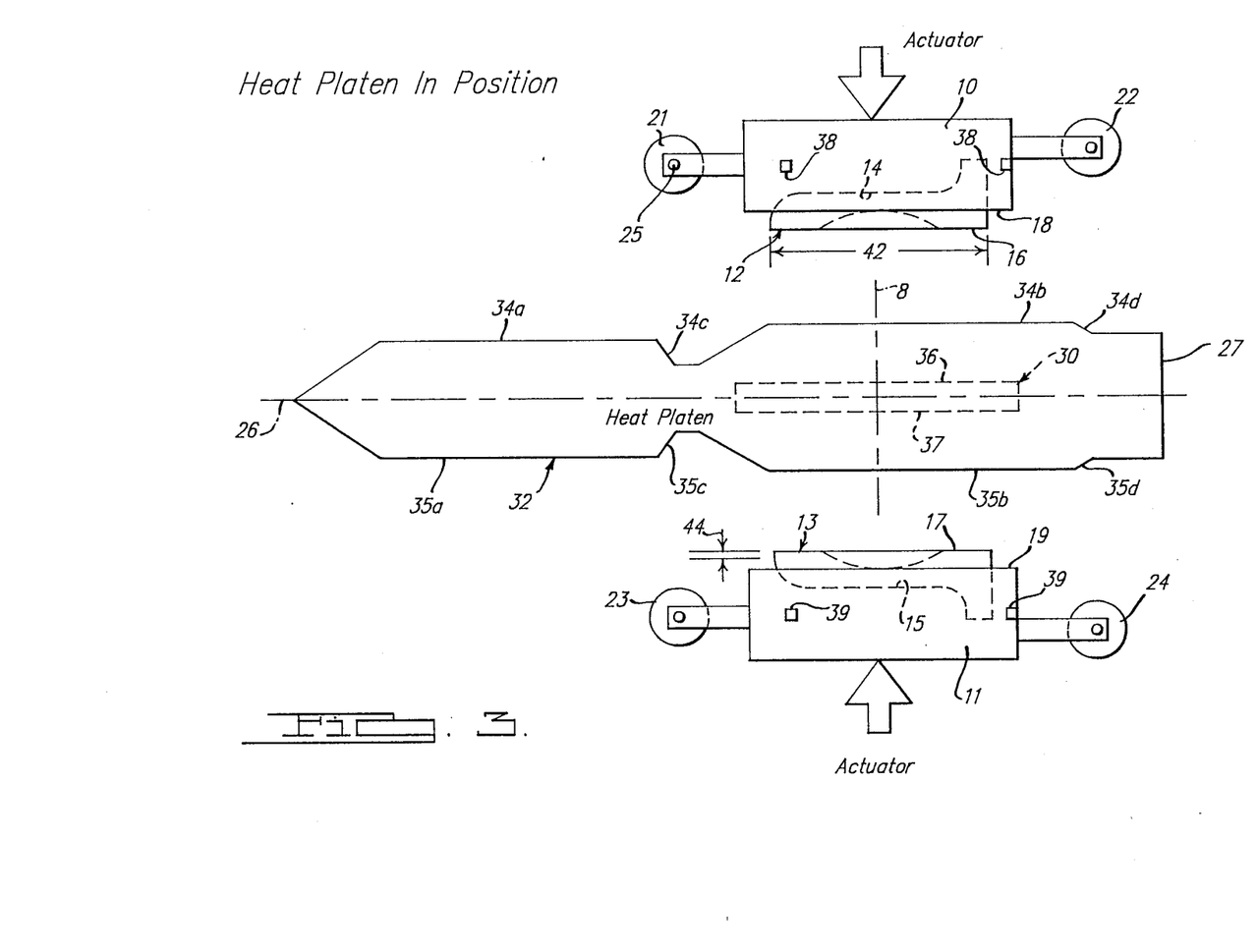
FIG. 2 is a schematic plan view of one form of apparatus effective to carry out the method of this invention, and which is illustrated in a first operative position for mounting the pattern portions.

Turning now to FIGS. 1 and 2, the preferred apparatus for carrying out the present invention comprises a pair of fixtures 10, 11, carried by a supporting structure 9, effective to permit movement of such fixtures toward and away from each other, along line 8, while being limited against movement transverse to line 8. The structure 9 may employ tracks 9a for sliding movement and a pneumatic cylinder 9b and actuating rod 9c for moving the fixtures. The fixtures have cavities 14, 15 for snugly receiving complementary pattern portions 12, 13 respectively. The cavities are arranged so that mateable margins 16, 17 of each respective pattern portion project beyond the innermost opposite facing surfaces 18, 19 of the fixtures a predetermined distance 20, preferably about 0.075 inches. Pairs of camming rollers 21, 22 on one fixture and 23, 24 on the other fixture are arranged as shown in FIGS. 1 and 2. The camming rollers each are supported by yokes 26 for rolling movement about axes 25 perpendicular to the line of movement 8; the yokes project away from each side 27 and 28 of each fixture.

Figure 4:
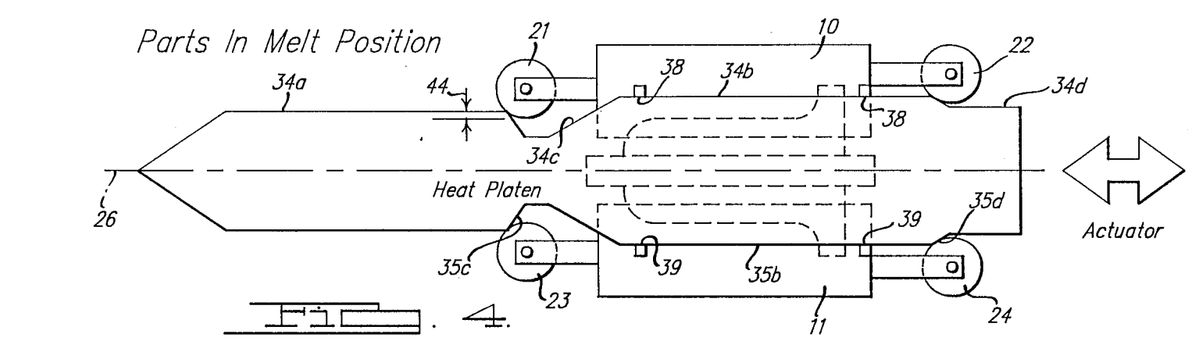

The heating platen 30 is heated to a temperature in the range of 250°–450° F. and is supported on a platen support 31 for movement in a direction transverse to line 8 (the to and fro linear directional movement of the fixtures) and carries camming plates 32, 33 respectively at top and bottom portions thereof. The edges of each such plates form oppositely facing camming surfaces 34, 35; each of said camming plates are arranged to control the spacing between the mateable margins (16, 17) of the pattern portions and the heating platen surfaces 36, 37 during insertion of the platen, heating contact with the platen, and withdrawal of the heated platen. For example, (see FIG. 5) when the rollers 21 contact cam surfaces 34a, and rollers 22 contact cam surface 34b, the margin 16 is spaced from the platen surface 36 sufficiently (a distance 40) so that such margins 16 cannot contact the heated platen surface 36 but are minimally spaced from such platen surface, such as a distance of 0.040 inches. Similarly, rollers 23 contact cam surface 34a and rollers 24 contact cam surface 35b to maintain margin 17 minimally spaced from surface 37. When the cam plates 32 and 33 are moved laterally sufficiently along plane 26, notches 34c and 34d will be aligned with rollers 21 and 22 respectively and notches 35c and 35d will be aligned with rollers 23 and 24 respectively (see FIG. 3). The heated platen will be frontally aligned with the margins 16 and 17 in position of FIG. 3. The fixtures 10 and 11 are actuated to be brought together permitting the biasing forces acting on the fixtures to bring stops 38 on fixture 10 against cam surface 34b, and stops 39 of the other fixture 11 against cam surface 34b (see FIG. 4). The margins 16 and 17 meet the platen surfaces, prior to the contact of such stops with the camming surfaces, to promote a predetermined compression 44 of the thermoplastic (desirably 0.02–0.045 inches). Such precompression is critical to controlling the melting of the thermoplastic and limiting it to a thin film, commensurate with the depth of compression. It is not fully understood why precompression acts as a melt control, but it is believed that during the short span of heated contact, the increased density generally confines most of the thermal conductivity to the precompressed zone. In the position of FIG. 4, you will note that all the rollers have ridden along the notched cam surfaces (34c, 34d, 34c, 35d) to a dimension 44 (of about 0.040″); this dimension is the dpeth of precompression.

To summarize and illustrate operation, FIGS. 2–7 show the sequence of mechanical movements. In the starting position of FIG. 2, the fixtures 10, 11 are maintained in a widely spaced-apart position with the camming rollers remote from the camming surfaces 34 and 35 of the platen. In this position, there is easy access to mounting the thermoplastic pattern portions 12 and 13 in the fixture cavities 14 and 15. In the position of FIG. 2, the camming plates are positioned with the index 27 (being commensurate with the end of the camming plates) aligned with operating position 1. Next, the heated platen and camming plates are moved transversely along plane 26 by actuator 31 between the widely spaced fixtures as shown in FIG. 3. The surfaces 36, 37 are frontally aligned with the margins 16, 17 of each pattern portion (frontal alignment is here used to mean that if the dimension 42 of the margins were to be moved along direction 8, the margins would fully meet surfaces 36 or 37 of the platen within dimension 43).

The fixtures are then actuated (see FIG. 4) to be brought together along direction 8 with the pattern margins being compressed slightly a distance 44 (0.02–0.04 inches) prior to stops 38, 39 making contact with camming surfaces 34b and 35b, respectively, and rollers 21, 23 meeting notch surface 34c and 35c respectively and rollers 22, 24 meeting notch surfaces 34d and 35d, respectively.

The compression depth of the margins should be in the range of 0.020–0.04 inches for thermoplastics having a density in the range of 0.7–2.5 lbs/ft$^3$. Positioning of stop surfaces 38, 39 regulate this compression distance relative to camming surfaces 34, 35. If the compression depth was considerably greater than 0.040 inch, then the compressed material would not be fully melted in the time frame of less than one second and permit the nonmelted, compressed material to spring back after release from the stops, deleteriously affecting the accuracy of the bonded assembly. If the compressed depth is less than 0.02 inch, insufficient material is fluidized and may be nonuniform across the mateable margins. The compressed zone increases thermal conductivity during the time frame of allowable melting.

Figure 5:
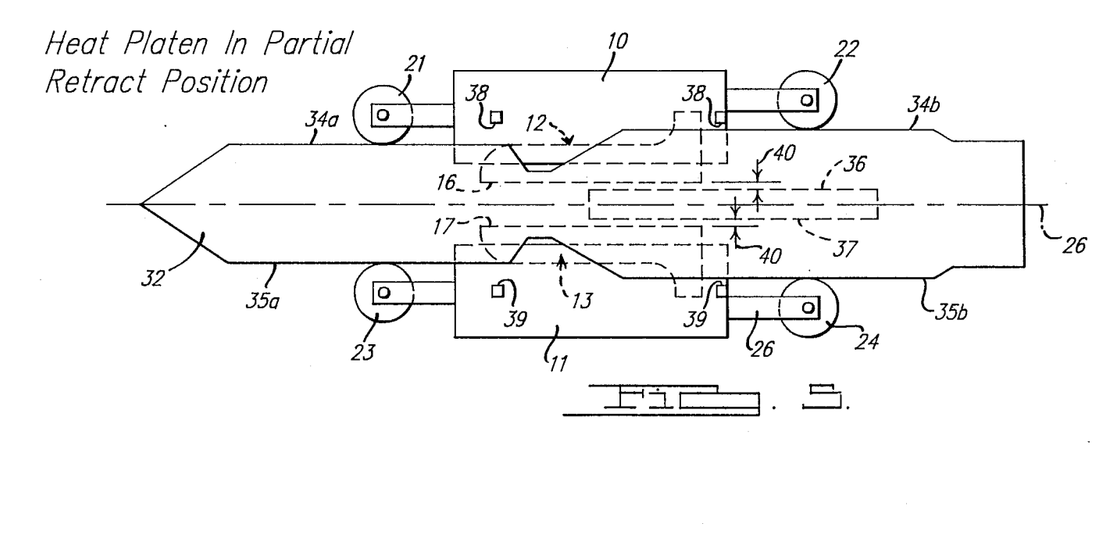

After a controlled time lapse, so that only a fluid film is generated, the heated platen is quickly withdrawn and returned to position 1. As shown in FIG. 5, the platen is only partially withdrawn; the rollers have ridden out of or up their associated notches onto the straight edge camming surfaces (34a, 34b, 35a, 35b). As a result of being cammed out of the notches, the roller supports cause the fixtures to withdraw a minimal distance (against the biasing forces of actuator 9) and slightly space the margins a distance 40 from the heat platen 30. As the platen continues its withdrawal, the camming rollers ride along the camming surfaces 34a, 34b and 35a, and 35b.

When the heated platen is out of the sight line between the mateable margins, the respective rollers ride down surfaces 34e, 34f, 35e and 35f, allowing the mateable margins 16,17 to make contact. After such contact is made, further withdrawal of the platen causes the rollers to leave the camming surfaces (see FIG. 6). The bias forces of actuator 9, operating on the fixtures, cause the mateable margins to accomplish two things: the fluid films on the margins, are merged together and a heat-settable sublayer of each margin (a sublayer is the solid grains or cells of the thermoplastic that have become further softened by heat and when returned to room temperature will set up in their moulded shape) is compressed to a predetermined desired depth, such compression preferably being substantially within the fixture cavity walls and thus moulded. In the position of FIG. 6, the fluid films as merged together and maintained in tight, compressed contact for a period of about 2–5 seconds after stops 70 and 71 on opposed fixtures meet to regulate the compression. During this heat setting or cooling period, compression of the sublayers to a depth of 0.05–0.07 inch (regulated by positioning of stops 70 and 71) is necessary to totally blend the fluid films across the entire mateable margin surfaces, enhance the quality of the plastic weld, and mould the joint to an almost invisible condition.

Figure 7:
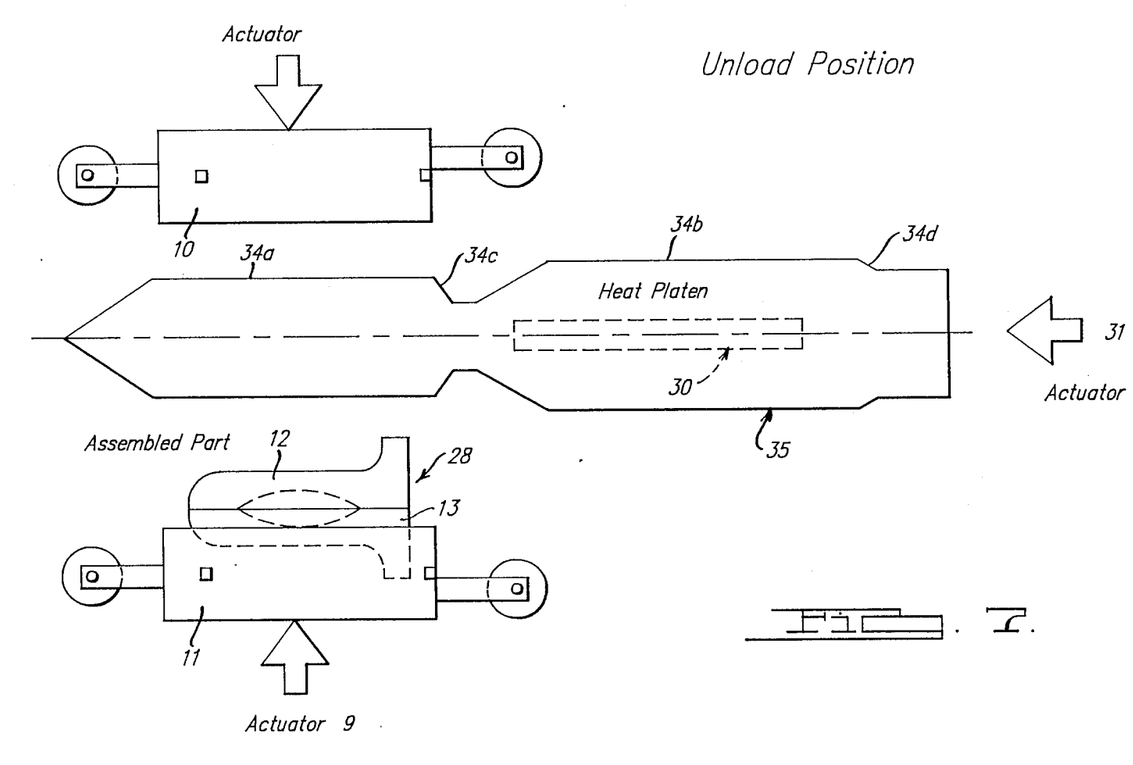
Figure 10:
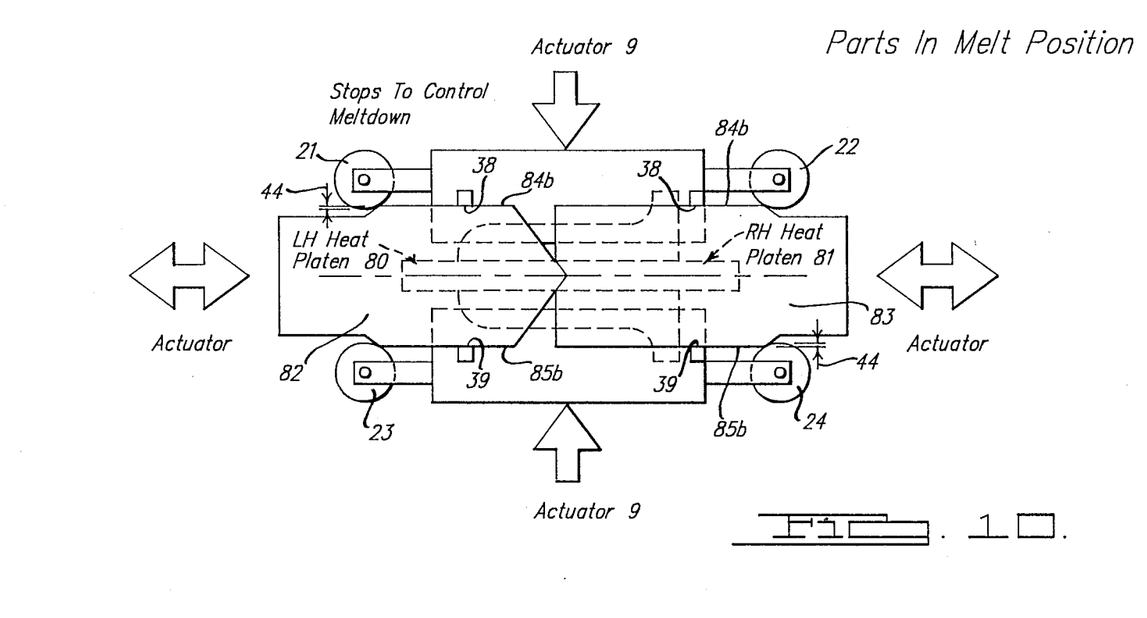
Figure 11:
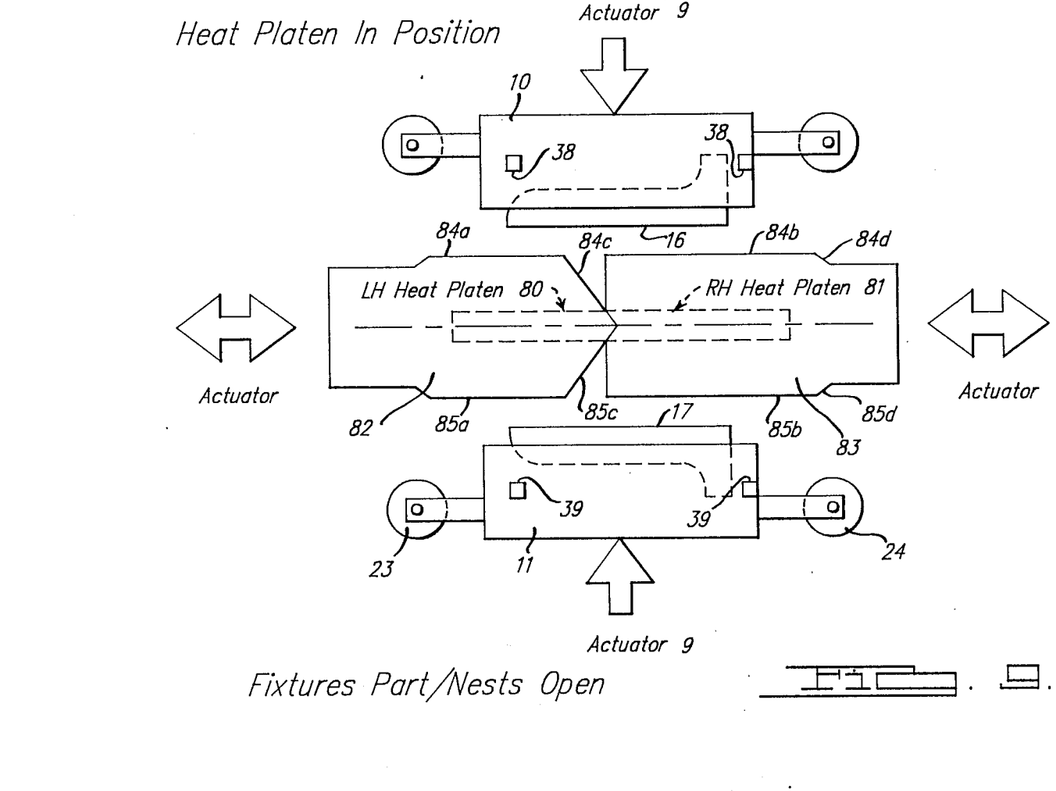
Figure 12:
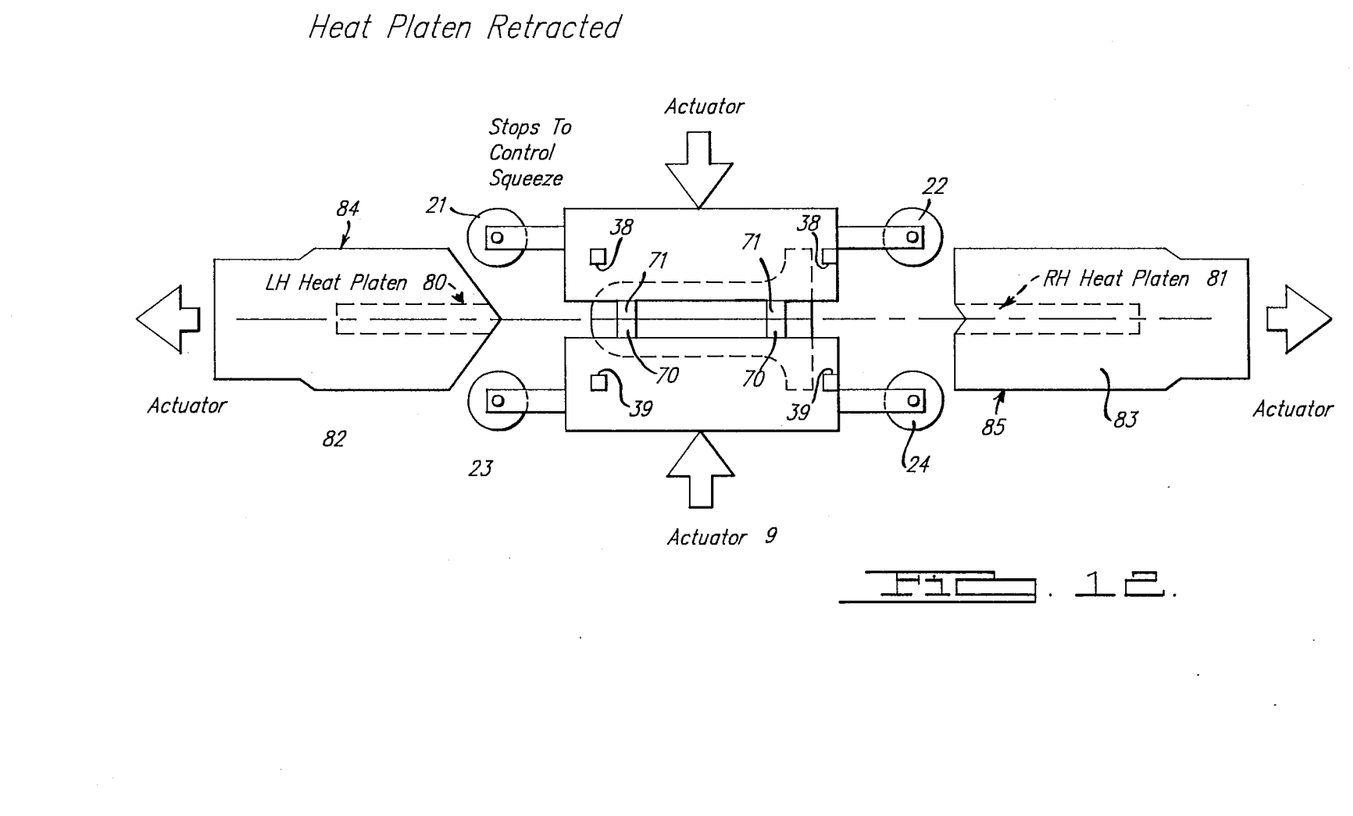

In the final stage, the fixtures are returned to their open position, with the bonded thermoplastic assembly 28 residing in one cavity (see FIG. 7).

The entire withdrawal movement can be equated to essentially the time lapse of pulling out the platen. The pattern portions are biased together so closely about the heated platen during this withdrawal stroke, and are actually moving together during the final increment of withdrawal, that there is no necessity for a separate and independent fixture stroke either in or out. The fluid films do remain fluid during the lapse of such a single withdrawal stroke, but would not be fluid if the sequence required a sequence of a separation stroke for the fixtures, a withdrawal stroke of platen, and a clamping stroke of the fixture to bring the margins together.

FIGS. 8–13 similarly illustrate the operation of an alternative embodiment in which the platen is bifurcated into portions 80, 81 and the camming plates are split to mate surfaces 82 and 83. The camming portions 84 and 85 remain the same in the mated condition of FIG. 9. The platen and plate is actuated to have its two parts withdraw in opposite directions to further decrease the time lapse during withdrawal and margin contact.

Figure 14:
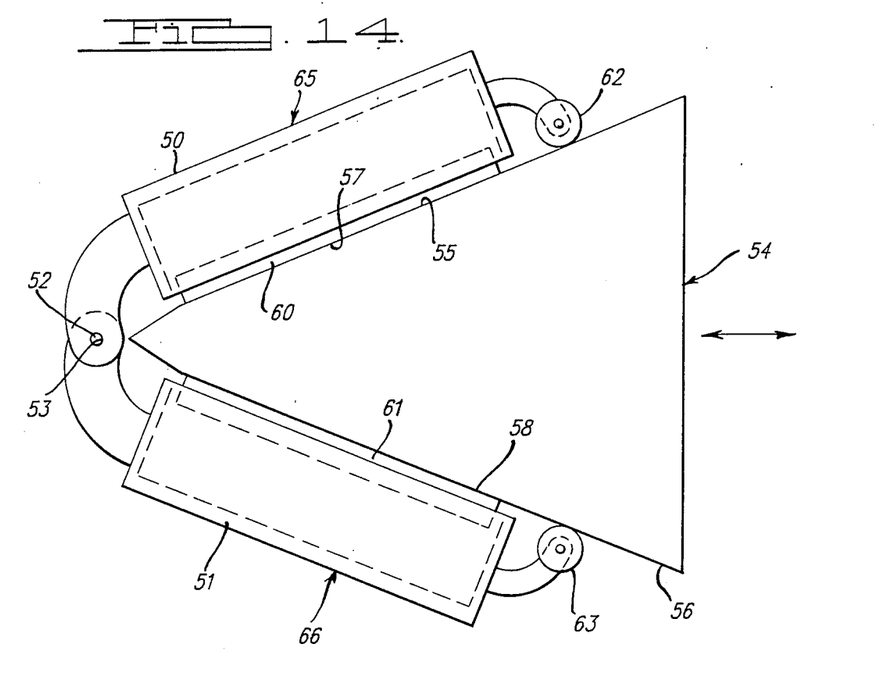
FIG. 14 is a schematic plan view of still another form of apparatus effective to carry out the method of this invention, and which is illustrated in one operative position showing a heated, wedge-shaped platen in full frontal heating contact with the mateable margins of the pattern portions.
Figure 15:
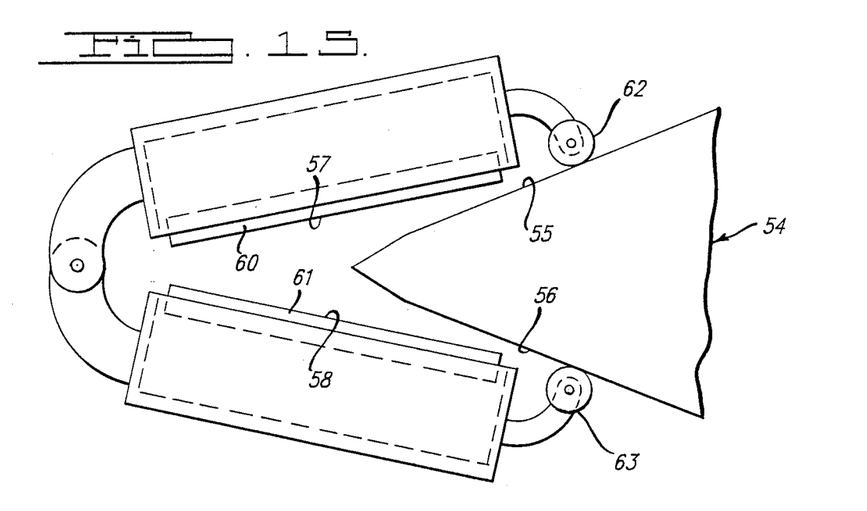
FIG. 15 is a view similar to that of FIG. 14 showing the heated platen in a partially withdrawn position, the pattern portions being minimally separated from the platen surface by camming means which ride the wedge while the pattern portions move arcuately toward each other for achieving mated contact.

Still another alternative embodiment is shown in FIGS. 14 and 15. It is comprised of fixtures 50, 51 which are mounted on a common pivot or on closely-spaced pivots 52, 53, as shown in FIG. 14. The heat platen 54, instead of being a flat, cylindrical structure, is constituted as a wedge-shaped construction having surfaces 55, 56 which are angulated to be parallel with the angulated surfaces 57, 58 (or mateable margins) of the pattern portions 60, 61 only when inserted toward the pivots at a predetermined position as shown in FIG. 14.

After generation of the fluid films on the mateable margins is achieved, the heat platen is withdrawn in a direction as shown in FIG. 15. Only a slight movement is necessary to create a severance and a minimal spacing between the mateable margins and the heat platen because of the use of camming rollers 62 and 63. These rollers ride on a surface aligned with the heated platen surfaces. Geometrically, a one millimeter movement of the heated platen to the right (as viewed in FIG. 7) will create sufficient spacing and an air gap between the mateable margin surfaces and the heated platen. As the withdrawal movement increases, greater separation from the platen occurs while the rollers ride down the angulated surfaces of the platen. Thus, during the entire withdrawal stroke of the heat platen, there is no contact or drag on the fluidized surfaces, which is an important element of this invention. After total transverse withdrawal of the wedge-shaped heated platen from the sight line between the opposed margins, the camming rollers will have ridden down the angulated surfaces a sufficient distance to permit the mateable margins to come into aligned contact with each other under biasing forces 65, 66 pushing the fixtures together. The movement of the fixtures together occurs simultaneously during the withdrawal stroke of the heated platen and confines the open fluid film time to less than one second and well within the cycle time necessary to create intimate contact between the fluidized films. This assists in optimizing the quick engagement of the fluid film within a period considerably less than one second.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

We claim:

1. A method of making a thermally welded, leakproof joint between compressible thermoplastic members having a density in the range of 0.75–2.5 lbs/ft$^3$, comprising:
    (a) fluidizing only a surface film on opposed mateable margins of said thermoplastic members without radiation destruction of such members remote from the margins said fluidizing being carried out by precompressing surface portions of the margins against a transversely stationary heated platen located therebetween, and continuing such contact to promote such fluidization of the precompressed surface portions by thermal conductivity and to make heat softened a limited, predetermined, nonmelted subsurface layer of said mateable margins; and
    (b) in rapid succession within a time period during which said films remain fluid, providing a narrow air gap between said margins and platen, withdrawing said platen from between said opposed margins and quickly bringing said mating margins together with sufficient force to merge said fluid films and compress said heat softened subsurface layers to achieve a predetermined moulded dimension.

2. A method of making a thermally welded, leakproof joint between compressible thermoplastic members having a density in the range of 0.75–2.5 lbs/ft$^3$, comprising:
    (a) fluidizing only a surface film on opposed mateable margins of said thermoplastic members without radiation destruction of such members remote from the margins, said fluidizing being carried out by precompressing surface portions of the margins against a transversely stationary heated platen located therebetween, and continuing such contact to promote such fluidization of the compressed surface portions by thermal conductivity and to make heat softened a limited, predetermined, nonmelted subsurface layer of said mateable margins; and
    (b) in rapid succession within a time period of less than about one second during which said films remain fluid, providing a narrow air gap between said margins and platen, withdrawing said platen from between said opposed margins, and bringing said mating margins together with sufficient force to merge said fluid films and compress said heat settable surface layers to achieve a predetermined moulded dimension.

3. The method as in claim 2, in which squeeze-out of fluid film around the joint is limited and controlled by said compression and moulding of the subsurface layers.

4. The method as in claim 2, in which said fluidized film is generated within the dimensional thickness range of 0.003–0.010 inch.

5. The method as in claim 2, in which said thermoplastic portions contain moisture prior to said fluidizing step, whereby the temperature and time required for fluidization is increased up to 30%.

6. A method of bonding compressible thermoplastic members having a density of 0.75–2.5 lbs/ft$^3$, comprising:
    (a) controllably fluidizing only a surface film on opposed mateable margins of said members, continuously biased toward each other by (i) permitting compression of surface portions of such margins held in contact against a relatively stationary heated platen located therebetween, and (ii) continuing said contact to melt the compressed surface portions of the margins and to make heat softened a solid subsurface layer of said margins; and
    (b) within a time period of less than one second during which said films remain fluid and in rapid succession overcoming the bias of said members to (i) provide an air gap of about 0.04 inches between said margins and platen while said platen remains between said margins, and (ii) thereafter withdrawing said platen and permitting said bias to bring said margins together immediately upon the withdrawal of said platen.

7. The method as in claim 6, in which said thermoplastic portions are comprised of a material selected from the group consisting of polystyrene, polymethylmethacrylate, and polycarbonates.

8. A method of permanently attaching mateable margins of compressible low density thermoplastic pattern portions having a density of 0.75-2.5 lbs/ft³ and said portions being useful in an evaporative casting process, comprising:

(a) supporting said pattern portions on fixtures effective to pivotally or linearly move said portions between a first position in which said mateable margins are spaced-apart and a second position in which said margins are mated, said fixtures being resiliently biased to carry said portions to said second position;

(b) moving a platen, heated to a temperature to fluidize surface regions of the mateable margins of said pattern portions on contact therewith, between said biased fixtures to said first position with said mateable margins separated from each other by a dimension slightly greater than the thickness of said platen;

(c) when said platen and mateable margins are frontally aligned, permitting said bias to effect contact of said margins with said platen, said bias compressing said surface regions of said margins, prior to fluidizing, to a depth substantially equal to the desired dimensional depth of fluidizing;

(d) holding said platen in contact with said margins for a period of time to fluidize the compressed surface regions of said margins;

(e) substantially immediately thereafter, returning said margins to said first position while withdrawing said platen from between said fixtures;

(f) as said platen is moving out of a sight line between said opposed mateable margins, permitting said bias to quickly bring said margins together while said fluidized films remain fluid, the time for steps (e) and (f) being less than about one second; and (g) allowing said fluid films to thermally set to effect a weld.

9. The method as in claim 8, in which during step (d) said heated platen creates a heat effected, unmelted subsurface layer on each of said margins, and during steps (f) and (g), said subsurface layers are moulded to a desired shape.

10. The method as in claim 8, in which said thermoplastic body is comprised of polystyrene and said platen temperature is maintained in the region of 250°-450° F.

11. The method as in claim 8, in which said thermoplastic body is comprised of a material selected from the group consisting of polystyrene, polymethylmethacrylate, and polycarbonates.

12. The method as in claim 8 in which said fixtures are biased with a force which is in the range of 50-450 psi.

13. The method as in claim 8, in which the time of contact during step (d) is in the range of 2-5 seconds.

14. The method as in claim 8, in which the fixture are biased with a force which is limited in step (b) so as to provide a compression dimension of 0.02-0.060 inch in step (c).

15. The method as in claim 8, in which supporting is carried out by use of support fixtures, for the pattern portions, arranged for linear movement to and from each other in a direction under the influence of said bias, and said platen, carrying opposed heating surfaces, is moveable in a direction transverse to the direction of movement of the fixtures 16. The method as in claim 15, in which said platen and fixtures carry cooperative camming means that, upon transverse movement of the platen, cause the pattern portions to be out of contact with the platen heating surfaces by a varion air gap until such time as the platen heating surfaces are frontally aligned with the mateable margins to be heated.

17. The method as in claim 8, in which mechanical stops are employed to regulate compression of the thermoplastic prior to melting.

18. The method as in claim 16, in which during step (e) and as the platen clears the sight line between the mateable margins, the mateable margins slip together for regulated compression and setting of the weld.

* * * * *